May 8, 1956 W. D. PETERSON 2,744,969
D.C. AMPLIFIER
Filed Aug. 4, 1952
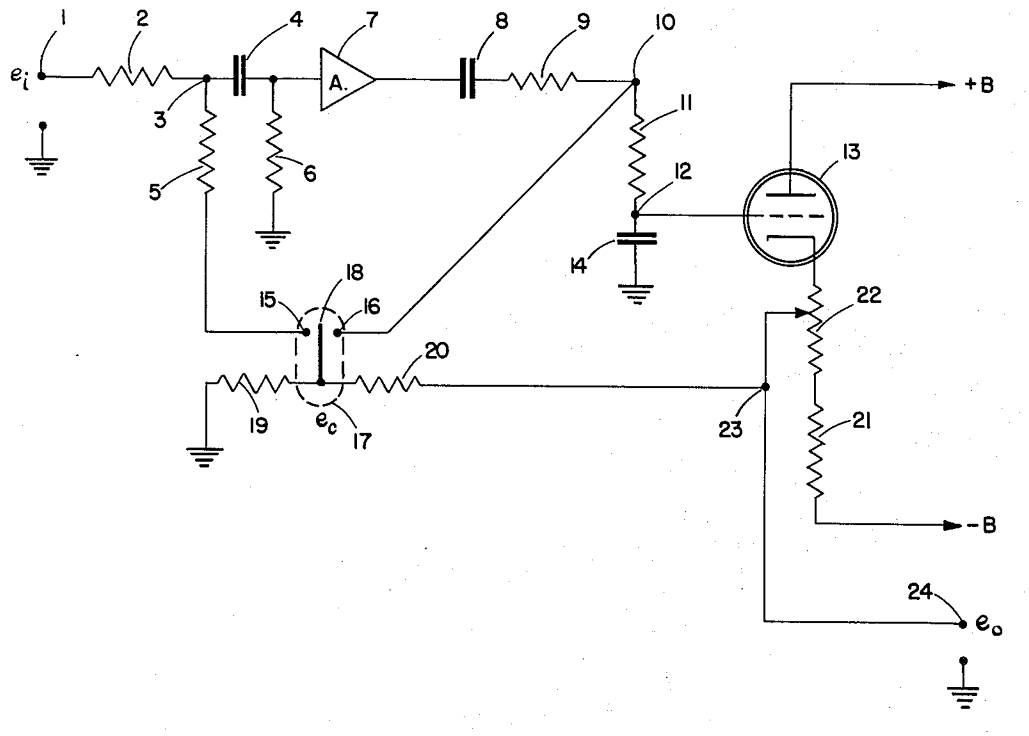
INVENTOR.
WILLIAM D. PETERSON
BY William R. Lane
ATTORNEY United States Patent Office 2,744,969

Patented May 8, 1956

2,744,969

D. C. AMPLIFIER

William D. Peterson, Long Beach, Calif., assignor to North American Aviation, Inc.

Application August 4, 1952, Serial No. 302,461

1 Claim. (Cl. 179—171)

This invention relates to D.-C. amplifiers, and particularly to a D.-C. amplifier which produces a positive increment of output voltage for a positive increment of input voltage, and a negative increment of output voltage for a negative increment of input voltage.

In the past, amplifiers proposed for handling direct current signals or signals having a frequency of the order of one or two cycles per second have fallen into two classes. The first class involved the use of direct-coupled electron tubes wherein the potential upon the grid of a tube influenced the actual space current flow within the tube, and this effect was carried through several stages of amplification to achieve a net significant gain. This class of devices suffers from the disadvantage that variations in ambient temperature, variations in plate supply voltage, variations in filament supply voltage, and a multitude of other factors affects the gain of each stage and hence the magnitude of the output signal. The second class of devices utilizes some sort of chopper or synchronous rectifier in combination with an A.-C. amplifier. It is with this second class of devices that this invention is concerned.

This invention contemplates provision of a chopper type direct-current amplifier which is capable of functioning with a minimum drift of calibration or sensitivity for extended periods of time.

It is another object of this invention to provide a chopper type direct-current amplifier to supply an output voltage which varies directly with respect to an input voltage.

It is another object of this invention to provide a chopper type direct-current amplifier whose output varies in the same direction as its input.

Other objects of invention will become apparent from the following description taken in connection with the accompanying single figure which is a circuit diagram of the invention.

Referring to the single figure, an input signal $e_i$ is introduced at terminal 1 which is connected by resistance 2 to a terminal point 3 to which condenser 4 and resistance 5 are connected. Condenser 4 is connected to the input of amplifier 7 with a resistor 6 connected from the input of the amplifier to ground. The output of amplifier 7 is fed by a condenser 8 and resistor 9 to connection point 10, and this point is connected to the grid of triode 13 by resistor 11. The grid of triode 13 is connected to ground by a condenser 14 attached at branch point 12. Point 10 is connected to terminal 16 of chopper 17, terminal 15 of which is connected to resistor 5, as shown. Reed 18 is connected to ground by resistor 19, and to branch point 23 by resistor 20. Branch point 23 is connected to output terminal 24 of the device, and also to variable cathode resistor 22 which is connected to a negative supply voltage by resistor 21.

In operation, it is immediately apparent from the single figure that $e_0$, the voltage on the reed of chopper 17, is but a fraction of the output voltage of the device. This fraction is determined by the net gain of the amplifier, and the operation of the device can best be understood if it be realized that it is the object of the various functioning parts thereof to cause $e_c$ to equal $e_i$. If $e_c$ equals $e_i$, when reed 18 is in contact with terminal 15 of chopper 17 no current is drawn through the chopper to ground, and there is no signal input to amplifier 7. However, if the input signal $e_i$ is more positive than the voltage $e_c$ appearing at chopper reed 18, contact of reed 18 with terminal 15 causes current to flow through resistor 6 and a negative swing upon the input grid of amplifier 7. Amplifier 7 consists of an odd number of stages of amplification such that the direction of change of the output of amplifier 7 is opposed to the direction of change of input thereto. The output signal, of course, is amplified in accordance with whatever gain amplifier 7 has.

If the time constant of the combination of resistor 9 and condenser 8 is made very small, at the time reed 18 is in contact with terminal 16, the output voltage of amplifier 7 will appear across condenser 8. Then when reed 18 is in contact with terminal 15, the voltage appearing at point 10 will be equal to the output voltage of amplifier 7 less the voltage on condenser 8, the voltage to which it was charged in the previous half cycle of operation. If the time constant of a combination consisting of resistor 11 and condenser 14 is made very long, the voltage fed to the grid of triode 13 is smoothed or filtered. With $e_i$ greater than $e_c$, therefore, it can be seen that positive pulses arrive at point 10 and are filtered and applied to the grid of triode 13, with the result that the current through triode 13 increases. If the current through triode 13 increases, the voltage at point 23 increases and $e_c$ increases, bringing $e_c$ substantially to equality with $e_i$. As $e_c$ approaches equality with $e_i$ the input to amplifier 7 decreases, with the result that the circuit tends to stabilize itself.

When $e_i$ is more negative than $e_c$ an opposite effect is obtained, with the result that the circuit is again stabilized with $e_c$ substantially equal to $e_i$.

Since $e_i$ is connected to the input of an A.-C. amplifier, the device may be made to have a very high input impedance, and yet because of the cathode follower action of triode 13 a significant amount of power may be drawn from the output without influencing the input thereto.

Although the invention has been described and illustrated in detail, it is to be clearly understood that the same is by way of illustration and example only and is not to be taken by way of limitation, the spirit and scope of this invention being limited only by the terms of the appended claim.

I claim:

Means for producing a direct current output signal directly proportional to a direct current input signal comprising a single pole double-throw switch operable at predetermined frequency, an alternating current amplifier having an odd number of voltage amplification stages, a capacitor connecting said input signal to said amplifier, a resistor connecting said input signal to a fixed terminal of said switch, a second capacitor connected to the output of said amplifier, means connecting the other side of the second capacitor to the other fixed terminal of said switch, a cathode follower, a filter connecting said other fixed terminal to the input of said cathode follower, and voltage divider means connecting a portion of the output of said cathode follower to the movable terminal of said switch, said movable terminal and the input to said amplifier being impedance connected to ground, whereby the output of said cathode follower is directly proportional to said input signal.

References Cited in the file of this patent

UNITED STATES PATENTS

| | | |
|---|---|---|
| 2,297,543 | Eberhardt et al. | Sept. 29, 1942 |
| 2,459,730 | Williams, Jr. | Jan. 18, 1949 |
| 2,615,064 | Stanton | Oct. 21, 1952 |